United States Patent [19]

Nakashima

[11] Patent Number: 5,835,589
[45] Date of Patent: Nov. 10, 1998

[54] OPTICAL RECORDING MEDIUM TO STORE AND ACCESS LARGE VOLUMES OF DATA

[75] Inventor: Kazuo Nakashima, Kawasaki, Japan

[73] Assignee: Fujitsu Limited, Kawasaki, Japan

[21] Appl. No.: 618,721

[22] Filed: Mar. 20, 1996

[30] Foreign Application Priority Data

Apr. 12, 1995 [JP] Japan ................................ 7-087264

[51] Int. Cl.⁶ ........................... G06F 12/14; G06F 17/30
[52] U.S. Cl. ........................................ 380/4; 369/275.2
[58] Field of Search ................... 340/825.34; 380/3, 380/4, 25; 386/45; 364/497.02, 497.04, 497.07; 369/275.1–275.5, 32, 274; 395/615; 707/9

[56] References Cited

U.S. PATENT DOCUMENTS

| | | | |
|---|---|---|---|
| 4,247,106 | 1/1981 | Jeffers et al. ............................ 463/29 |
| 4,439,670 | 3/1984 | Basset et al. .......................... 235/382 |
| 4,446,519 | 5/1984 | Thomas ................................. 395/491 |
| 4,484,217 | 11/1984 | Block et al. .............................. 348/3 |
| 4,558,176 | 12/1985 | Arnold et al. ............................ 380/4 |
| 4,590,557 | 5/1986 | Lillie ..................................... 395/651 |
| 4,646,234 | 2/1987 | Tolman et al. ........................... 380/4 |
| 4,649,510 | 3/1987 | Schmidt .................................... 380/4 |
| 4,654,799 | 3/1987 | Ogaki et al. ...................... 364/479.04 |
| 4,658,093 | 4/1987 | Hellman ................................. 380/25 |
| 4,672,554 | 6/1987 | Ogaki ............................. 364/479.04 |
| 4,674,055 | 6/1987 | Ogaki et al. ...................... 364/479.04 |
| 4,740,890 | 4/1988 | William ................................. 395/186 |
| 4,780,905 | 10/1988 | Cruts et al. ............................. 380/44 |
| 4,787,050 | 11/1988 | Suzuki .............................. 364/479.02 |
| 4,816,653 | 3/1989 | Anderl et al. ......................... 235/380 |
| 4,816,654 | 3/1989 | Anderl et al. ......................... 235/380 |
| 4,817,140 | 3/1989 | Chandra et al. .......................... 380/4 |
| 4,864,516 | 9/1989 | Gaither et al. ........................ 395/806 |
| 4,879,645 | 11/1989 | Tamada et al. ....................... 235/380 |
| 4,949,257 | 8/1990 | Orbach ................................. 395/221 |
| 4,999,806 | 3/1991 | Chernow et al. ..................... 395/712 |
| 5,006,849 | 4/1991 | Baarman et al. ........................ 341/95 |
| 5,008,814 | 4/1991 | Mathur ............................. 395/200.51 |
| 5,014,234 | 5/1991 | Edwards, Jr. ......................... 395/186 |
| 5,016,009 | 5/1991 | Whiting et al. .......................... 341/67 |
| 5,040,110 | 8/1991 | Miki et al. ............................. 395/616 |
| 5,051,822 | 9/1991 | Rhoades ................................. 463/25 |
| 5,056,009 | 10/1991 | Mizuta ................................. 395/490 |
| 5,103,392 | 4/1992 | Mori ........................................ 380/4 |
| 5,103,476 | 4/1992 | Waite et al. .............................. 380/4 |
| 5,166,886 | 11/1992 | Molnar et al. .................... 364/479.04 |
| 5,181,107 | 1/1993 | Rhoades ................................. 348/13 |
| 5,191,611 | 3/1993 | Lang ..................................... 380/25 |
| 5,199,066 | 3/1993 | Logan ...................................... 380/4 |
| 5,214,697 | 5/1993 | Saito ....................................... 380/4 |
| 5,222,134 | 6/1993 | Waite et al. .............................. 380/4 |
| 5,245,330 | 9/1993 | Wassink .......................... 340/825.34 |
| 5,267,171 | 11/1993 | Suzuki et al. .................... 364/479.04 |
| 5,291,462 | 3/1994 | Richards ................................ 369/13 |
| 5,400,319 | 3/1995 | Fite et al. ........................... 369/275.5 |
| 5,418,852 | 5/1995 | Itami et al. ............................... 380/4 |
| 5,457,746 | 10/1995 | Dolphin ................................... 380/4 |
| 5,509,070 | 4/1996 | Schull .................................... 380/4 |
| 5,521,900 | 5/1996 | Ando et al. ....................... 369/275.1 |
| 5,537,387 | 7/1996 | Ando et al. ....................... 369/275.1 |
| 5,546,365 | 8/1996 | Roth ..................................... 369/32 |
| 5,636,277 | 6/1997 | Nagahama ............................... 380/4 |
| 5,646,992 | 7/1997 | Subler et al. ............................ 380/4 |

FOREIGN PATENT DOCUMENTS 57-127249  8/1982  Japan .
5-266575  10/1993  Japan .

Primary Examiner—Paul V. Kulik
Attorney, Agent, or Firm—Staas & Halsey

[57] ABSTRACT

When recording a large volume of data such as video data, audio data, or the like, it is desirable to delete menus for unnecessary files and thereby enable quick and efficient access to data. An optical recording medium having a data recording medium which is divided into at least a readable/writable first region and a second region used exclusively for data reading. The first region has recorded therein a title management information table in which filenames of software titles are registered in the second region, and a loader for executing or reproducing these software titles, wherein the loader and the software title correspond to each other. The second region has recorded therein at least two types of software titles.

8 Claims, 14 Drawing Sheets

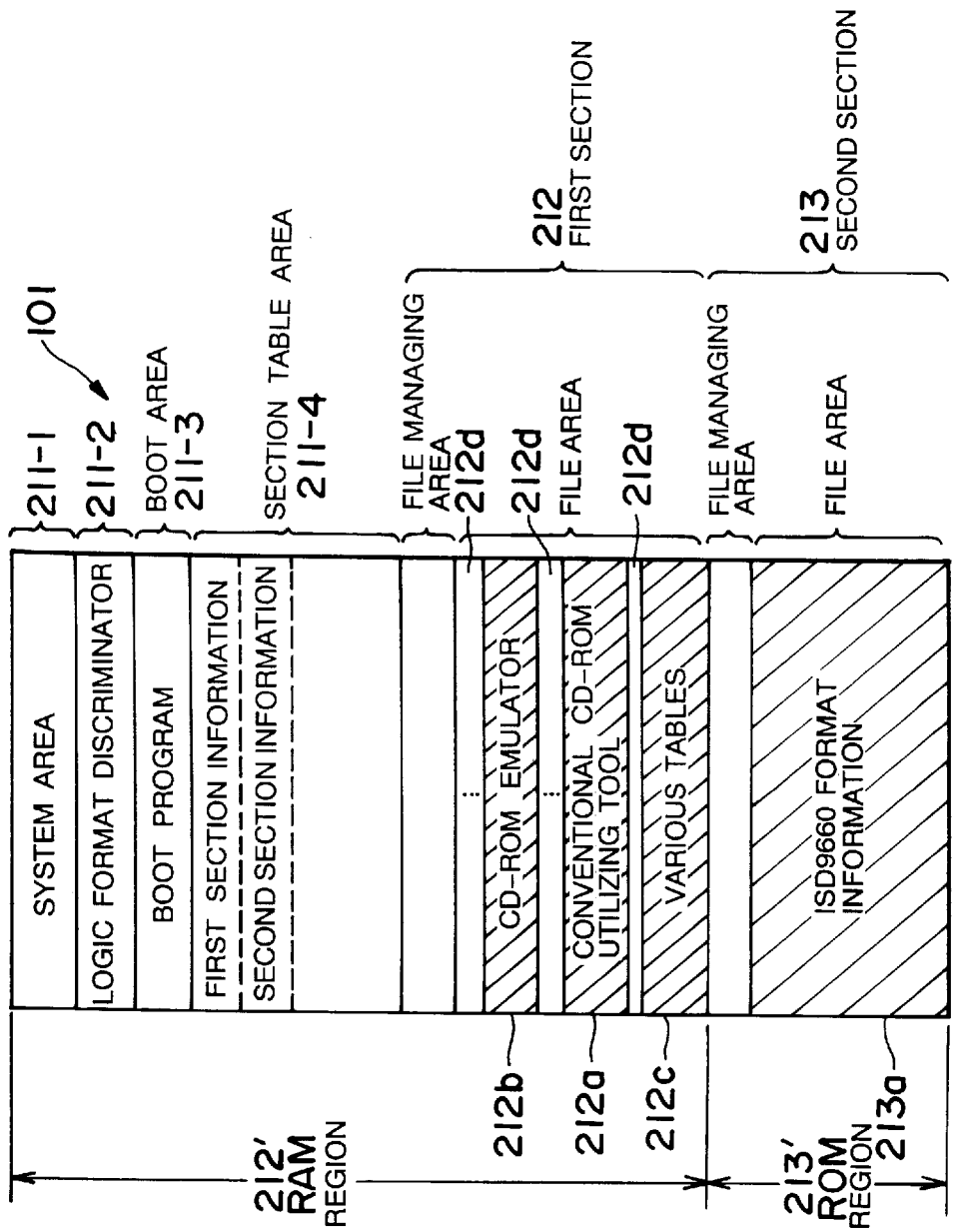

FIG. 11

| TITLE | FILE NAME | LOADER |
|---|---|---|
| APPLICATION SOFTWARE A | TEST_A.EXE | EXE EXECUTION LOADER |
| APPLICATION SOFTWARE B | TEST_B.EXE | EXE EXECUTION LOADER |
| APPLICATION SOFTWARE C | TEST_C.AVI | VIDEO DISPLAY LOADER |
| APPLICATION SOFTWARE D | TEST_D.WAV | AUDIO REPRODUCTION LOADER |
| APPLICATION SOFTWARE E | TEST_E.WAV | AUDIO REPRODUCTION LOADER |

FIG. 12

| TITLE | FILE NAME | LOADER |
|---|---|---|
| APPLICATION SOFTWARE A | TEST_A.EXE | EXE EXECUTION LOADER |
| APPLICATION SOFTWARE C | TEST_C.AVI | VIDEO DISPLAY LOADER |
| APPLICATION SOFTWARE E | TEST_E.WAV | AUDIO REPRODUCTION LOADER |

FIG. 13

| TITLE NAME | FOREMOST POSITION | RECORD LENGTH |
|---|---|---|
| PROGRAM A  DEMO | 1 2 3 | 8 |
| PROGRAM A  REAL | 1 2 3 | 8 |

FIG. 14

| TITLE NAME | FOREMOST POSITION | RECORD LENGTH |
|---|---|---|
| PROGRAM A  DEMO | 1 2 3 | 8 |
| PROGRAM A  REAL | 4 5 6 | 1 2 |

OPTICAL RECORDING MEDIUM TO STORE AND ACCESS LARGE VOLUMES OF DATA

BACKGROUND OF THE INVENTION

The present invention relates to a recording medium such as an optical recording medium or a phase-change type optical disc which is suitable for storage of a large volume of data such as video data or audio data and an access control system using the same.

CD-ROMs have been widely employed as media for storing large volumes of data such as video data or audio data. A CD-ROM is a medium comprising a transparent plastic layer, a metallic film, and a protective film. Pits (cavities) are formed in the plastic layer to thereby record data therein, the metallic film (e.g., aluminum) is formed on the pit surface by sputtering or deposition, and the protective film is provided thereover.

In such a CD-ROM, when laser light is irradiated onto the above-mentioned signal layer (pit and metallic film) via an objective lens, the characteristics of light rays reflected therefrom vary according to the relevant pits (cavities) and this reflected light is detected by a photodiode, thereby enabling data reading.

As mentioned above, in a CD-ROM, since data are recorded as pits, loss of data is less likely to occur compared to magnetic recording or the like. Further, since the data are fixed, accidental rewriting thereof can be prevented. Furthermore, a large number of CD-ROMs can be easily and inexpensively produced by stamping.

Owing to the above-mentioned merits, CD-ROMs stored with a large number of programs, pictures, sounds, etc., have recently been spreading. With this tendency, there is known a system wherein, in order to improve the selectability of data within a CD-ROM, menus regarding all the data within it are registered beforehand in a rewritable hard disc on the computers and, by designating a menu ICON, starting of a desired program or reproduction of data are enabled.

However, a CD-ROM has a capacity of 500 megabytes and, if the programs are relatively short, can accommodate several hundreds of programs therein. However, an ordinary user uses only several programs from within a single CD-ROM. Therefore, it is undesirable that all the programs within a CD-ROM are always kept selectable from menus presented by the CD-ROM and that this necessitates that a user must roll up or down menu screens until a desired menu appears.

SUMMARY OF THE INVENTION

The present invention has been achieved in view of the above-mentioned problems and an object thereof is, when reading out menu information recorded in a large-capacity data recording medium such as, for example, a magneto-optical disc or the like and displaying it on a menu screen of a user's system, to prevent menu ICONs unnecessary for a user from being displayed on the screen and to thereby display only desired menus of a software improve the user's ease of use.

In the present invention, as illustrated in FIG. 1 which is a principle view, an information recording medium such as a magneto-optical disc or the like is at least divided into a first region (RAM region) enabling data reading and writing, and a second region (ROM region) exclusively used for data reading. In the first region, there is recorded a title managing information table (301) in which filenames constituting softwares (software titles) stored in the second region are registered in software units in correspondence with loaders for executing or reproducing the files while, on the other hand, in the second region there are recorded at least two softwares.

Also, access to the softwares stored in the second region may be controlled by providing an address information table (302) in the first region.

In the above-mentioned means, by providing the title managing information table (301) in the readable/writable region (RAM region) on the optical recording medium 101 and registering in this title managing information table 301 only software titles which are needed by a user, it is possible, for example, to prevent unnecessary menu ICONs from overflowing on a screen of menus, thereby enabling quick and efficient starting of software titles needed by a user.

BRIEF DESCRIPTION OF THE DRAWINGS

FIG. 7 is a view illustrating a format of a magneto-optical disc in the embodiment of the present invention;

FIG. 11 is a view illustrating an initial state of a title managing information table;

FIG. 12 is a view illustrating the title managing information table after rewriting thereof;

FIG. 13 is a view illustrating an initial state of an address information table;

FIG. 14 is a view illustrating the address information table after rewriting thereof.

DESCRIPTION OF THE PREFERRED EMBODIMENT

Figure 1:
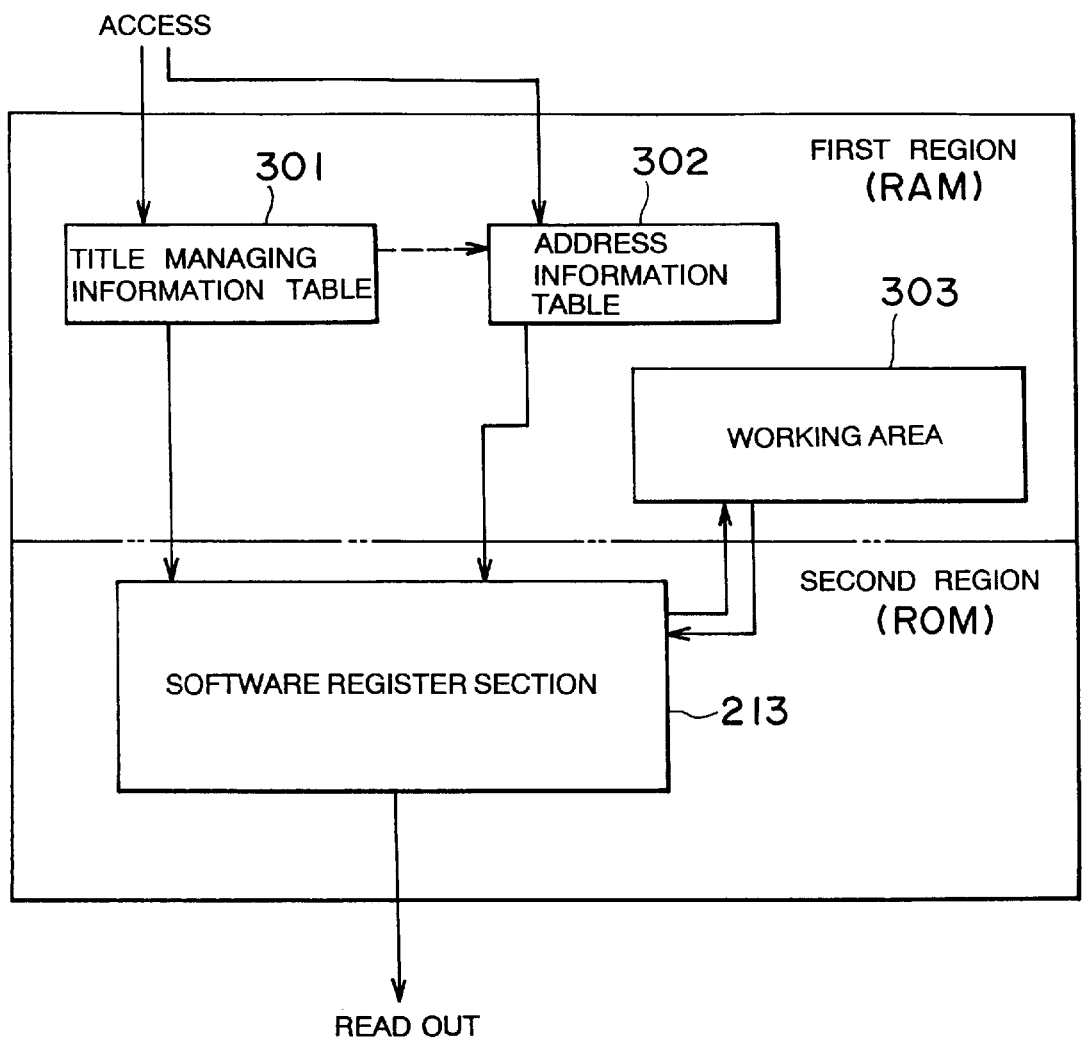
FIG. 1 is a principle view illustrating the principle of the present invention.

An embodiment of the present invention will now be explained.

FIG. 7 is a view for explaining data to be recorded in a magneto-optical disc medium 101 of the present invention. Reference numeral 101 denotes a magneto-optical disc medium which has a partial ROM structure. It comprises a rewritable RAM region 212' and a ROM region 213' wherein recording data are recorded as pits by stamping. The magneto-optical disc medium 101 has a volume structure wherein each of the RAM and ROM regions has one section in accordance with ECMA-167 (ISO-DIS 13356).

In the RAM region 212', 211-1 is a system area, 211-2 is a logic format discriminator area, 211-3 is a boot area, 211-4 is a section table area, and 212 is a first section. In the ROM region 213', 213 is a second section (program register section).

The first section 212 is formatted in accordance with, for example, ISO9293 (MS-DOS) and is recorded with a conventional CD-ROM utilizing tool 212a, CD-ROM emulator 212b, and various tables 212c.

The second section 213 is previously recorded with software data such as video data, audio data, programs, etc. as pits (cavities) in accordance with ISO9660 (CD-ROM logic format) by stamping.

The conventional CD-ROM utilizing tool 212a is an application for utilizing conventional software data having an IO9660 format, and video reproduction loaders, audio reproduction loaders, etc. are prepared therefor.

The CD-ROM emulator 212b is an application for converting a CD-ROM access request (reading command) issued from the conventional CD-ROM utilizing tool to a magneto-optical disc access request. This application has a magneto-optical disc BIOS made up in accordance with MS-DOS.

The sequential order, location, and the like in which the conventional CD-ROM utilizing tool 212a and CD-ROM emulator 212b are recorded can be arbitrarily determined and it is sufficient if each of them can be recognized as a file in accordance with ISO9293.

Although various tables 212c will be described later, these tables function as those in which there are registered beforehand user information data regarding the magneto-optical disc 101.

Also, in the first section 212 (RAM region), the remaining areas other than the areas where the CD-ROM emulator 212b, the conventional CD-ROM utilizing tool 212a and the various tables 212c are registered are utilized as working areas 212d.

Figure 8A:
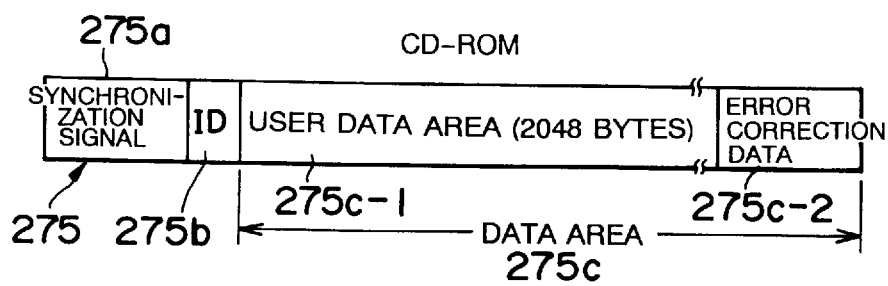
FIGS. 8(a) and 8(b) are views for explaining data block formats of a CD-ROM and a magneto-optical disc.
Figure 8B:
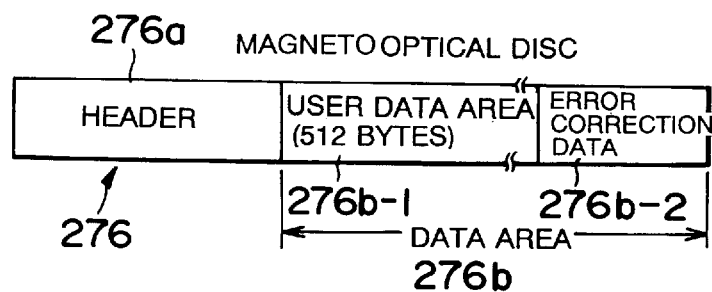

FIGS. 8A and 8B are conceptual views for explaining data blocks (sectors) of a CD-ROM and a magneto-optical disc. FIG. 8A illustrates the format of a data block in a CD-ROM while, on the other hand, FIG. 8B illustrates the format of a data block in a 3.5-inch magneto-optical disc which is determined in accordance with the ISO standard.

In FIG. 8A, 275 represents one data block of a CD-ROM which has a synchronization signal area 275a, an ID area 275b and a data area 275c. The synchronization signal area 275a is recorded with a synchronization signal for correctly reproducing successive data. Also, the ID area 275b is recorded with data (address data) which identifies the location of the data block. The data area 275c is composed of a 2048-byte user data area 275c-1 and a 288-byte error correction information area 275c-2 for detection and correction of errors.

In FIG. 8B, reference numeral 276 represents one data block in a magneto-optical disc which has a header area 276a and a data area 276b. In the header area 276a there are recorded a synchronization signal and an ID (address data) identifying the location of this data block. The data area 276b is composed of a 512-byte user data area 276b-1 and an error correction area 276b2.

From the above, the data size of one block in a CD-ROM is 2048 bytes which is four times as large as the data size of one block in a magneto-optical disc. Accordingly, data (2048 bytes) of one block in a CD-ROM can be divided into four parts, each having a data size of 512 bytes, which can be recorded as 4 blocks in a magneto-optical disc.

Figure 9:
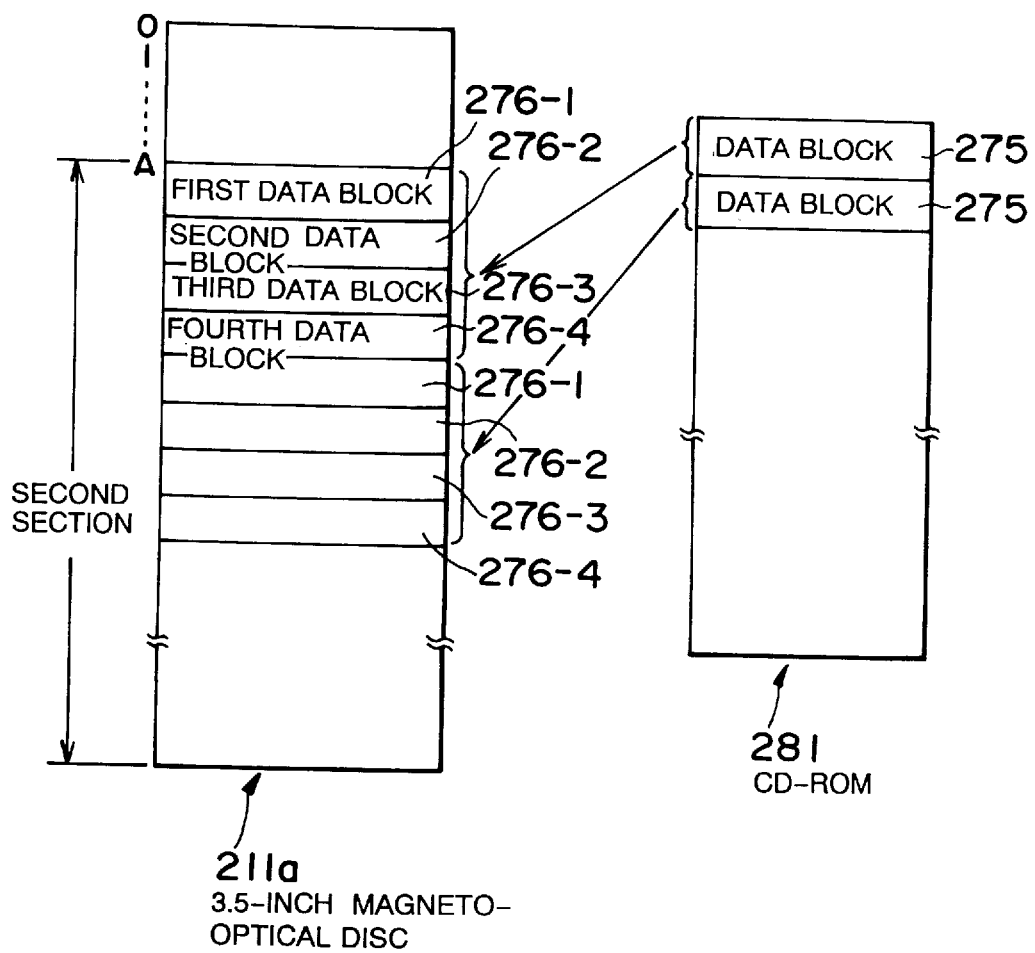
FIG. 9 is a view illustrating conversion of data in a case where data are stored in the magneto-optical disc.

FIG. 9 is a view for explaining storage of data in the second section 213 (ROM region) of a 3.5-inch magneto-optical disc. Reference numeral 211a denotes a 3.5-inch magneto-optical disc which has the second partition 213 on the disc.

Reference numeral 281 denotes a CD-ROM. As mentioned previously, the user data area of one data block in the CD-ROM 281 has a data size of 2048 bytes while, on the other hand, the user data area of one data block in the 3.5-inch magneto-optical disc 211a has a data size of 512 bytes. For this reason, the user data of one data block 275 in the CD-ROM 281 is divided into four parts and data of these four parts are respectively recorded as four data blocks 276-1 to 276-4 on the 3.5-inch magneto-optical disc 211a. Thereafter, the user data of each data block in the CD-ROM 281 is divided into four parts and data of these four parts are respectively recorded as four data blocks on the 3.5-inch magneto-optical disc 211a. In this case, with a foremost block number in the second section 213 being assumed to be A, the data block numbers of the four data blocks in the 3.5-inch magneto-optical disc 211a in which there are recorded data the same as the data of the (x)th data block in the CD-ROM 281, are which A+4·x, A+(4·x+1), A+(4·x+2), A+(4·x+3). Note that in these numbers, (·) means multiplication.

Figure 10:
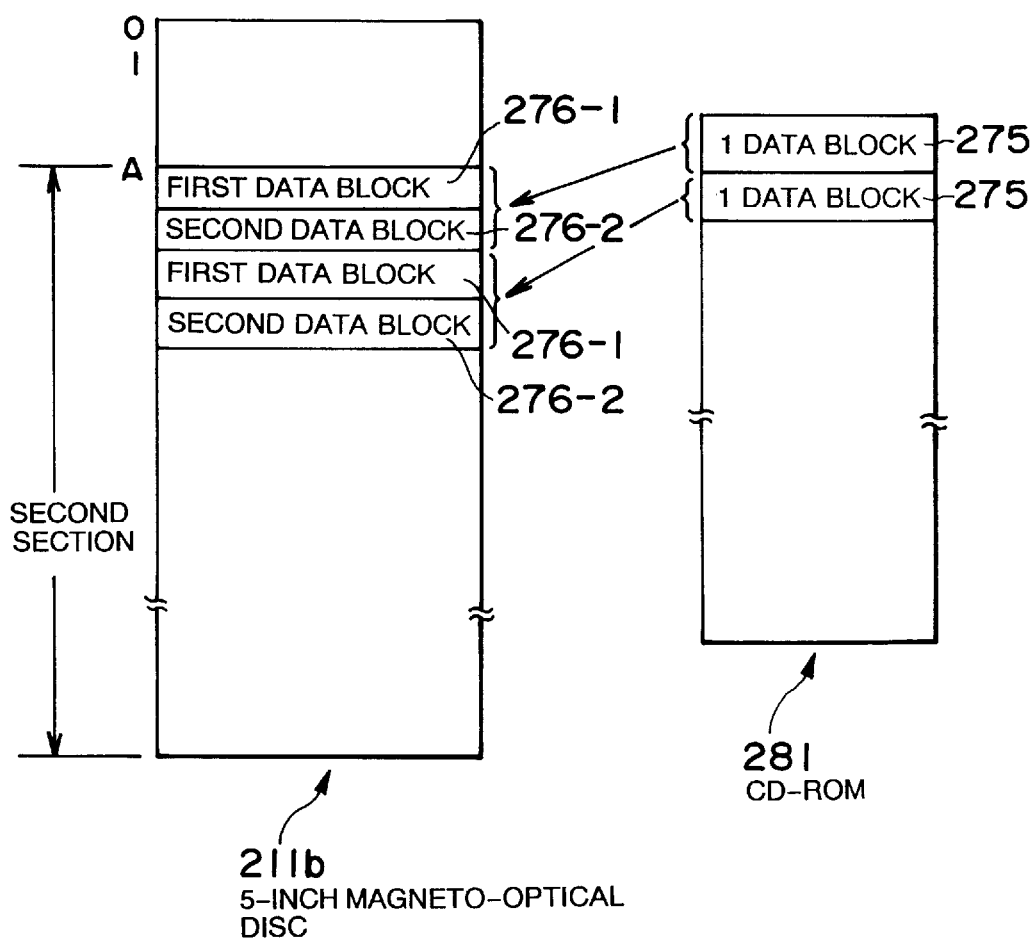
FIG. 10 is a view illustrating conversion of data in a case where data are stored in the magneto-optical disc.

FIG. 10 is a view for explaining storage of data into the second section 213 of a 5-inch magneto-optical disc. Reference numeral 211b denotes a 5-inch magneto-optical disc. In this disc, the user data area of one data block has a data size of 512 bytes or 1024 bytes. According to the ISO standard, two data sizes of 512 bytes and 1024 bytes are recognized as for the user data area in a 5-inch magneto-optical disc. For this reason, in the case of a disc having a data area of 1024 bytes, the user data of one data block 275 in a CD-ROM 281 is divided into two parts and data of these two parts are respectively recorded as two data blocks 276-1 and 276-2 in the 5-inch magneto-optical disc 211 b. In this case, with a foremost block number of the second partition 213 being assumed to be A, the data block numbers of two data blocks in the 5-inch magneto-optical disc in which there are recorded data the same as the data of the (x)th data block in the CD-ROM 281, which are A+2·x, A+(2·x+1).

Of the various tables 212c registered in the first section 212, a title managing information table 301 will be explained.

The title managing information table 301 has a structure as illustrated in FIG. 11. Namely, the titles, filenames, and loader names of various softwares (application programs A to E) are described in corresponding relation to each other.

In FIG. 11, for example, the application softwares A and B are each of an execution file type as defined with an expander of "EXE" and, when each of these application softwares is started up from WINDOWS, the use of a corresponding EXE software execution loader becomes necessary.

The application software C is video data as defined with an expander of "AVI" and, when this software is reproduced, the use of a video display loader such as a multimedia player on WINDOWS becomes necessary.

The application softwares D and E are each audio data as defined with an expander of "WAV" and, when each of these softwares is reproduced, the use of an audio reproduction loader becomes necessary.

Figure 16:
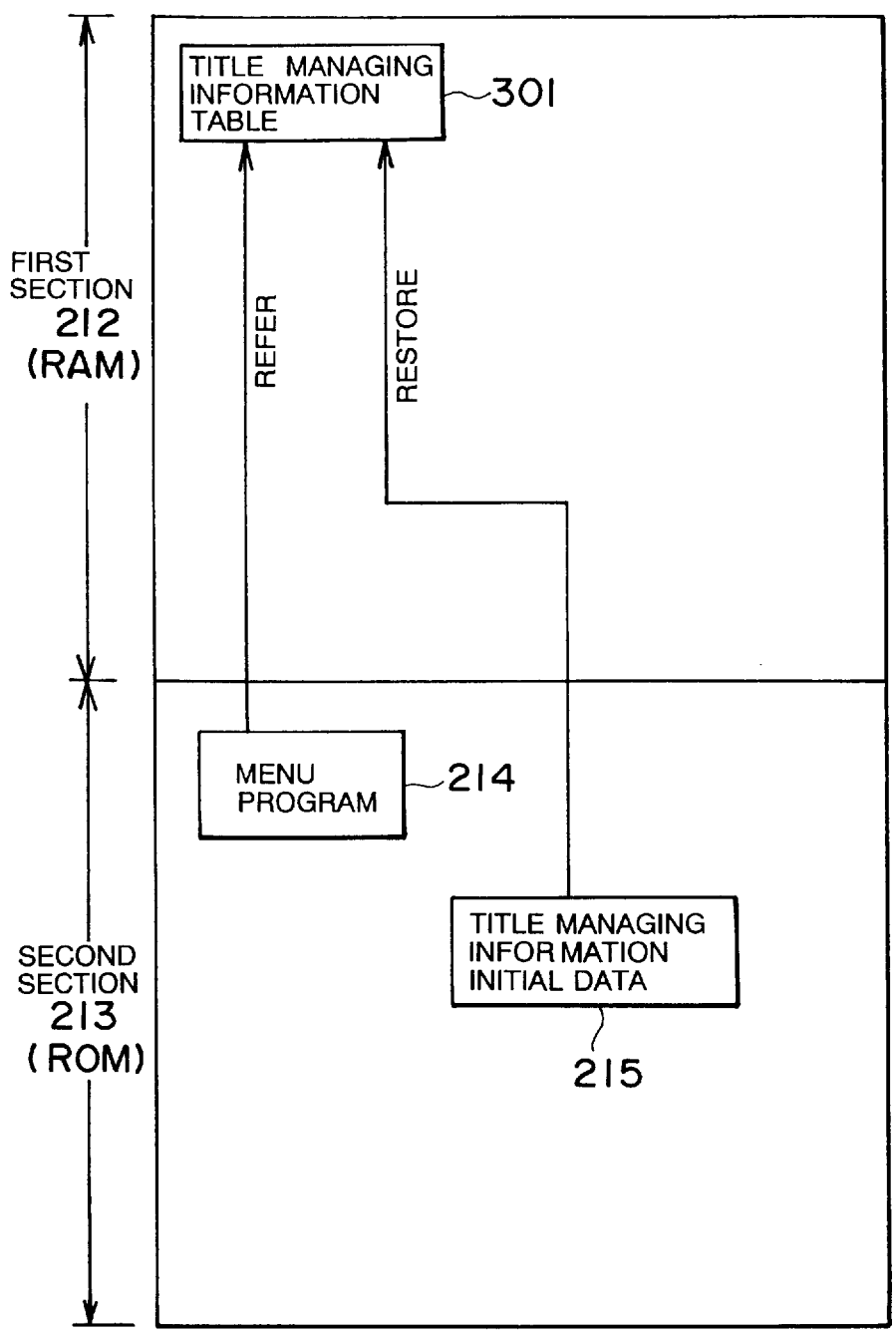

This title managing information table 301 is reflected on a menu of the CD-ROM as it is. As illustrated in FIG. 16, when a menu program 214 registered in the second section 213 is started up, reference is had to the title managing information table 301 in the first section 212, whereby the menu program 214 displays only the title softwares registered in the table 301.

One of the characterizing features of the present embodiment lies in that this title managing information table 301 is registered in the readable/writable first section 212. That is, the title managing information table 301 is rewritable. Therefore, by previously omitting information data regarding files unnecessary for a user, menu screen data can be reconstructed in conformity with a user's convenience.

The title managing information table 301 thus reconstructed is illustrated in FIG. 12. In this figure, the application programs B and D are deleted from the table of FIG. 11.

Regarding each title of the title managing information table 301, only deletion and addition have been explained, however alteration of the sequential order of titles may also be performed. In this case, the sequential order of titles appearing in the menu can be altered.

Meanwhile, after part of the application softwares displayed by the menu program 214 have been deleted or altered, there may be a case where a user wishes to restore the menu program 214 to the original state by reason of his own convenience. For example, although in FIG. 12 the application softwares B and D have been deleted, there may be a case where a user wishes to restore the application softwares B and D to the menu.

In this case, as illustrated in FIG. 16, initial data 215 of the title managing information table 301 registered in the first section 212 are registered in the second section 213.

That is, the initial data 215 of the title managing information are data (initial data) for preserving a state of the title managing information table prior to performance of user's deletion and alteration. When a user wishes to restore the title managing information table to its initial state, he can read out the title managing information initial data 215 in the first section 213 and rewrite the title managing information table 301 in the first section 212, thereby restoring this title managing information table 301 to its initial state (the state wherein all the application softwares are registered).

Figure 15:
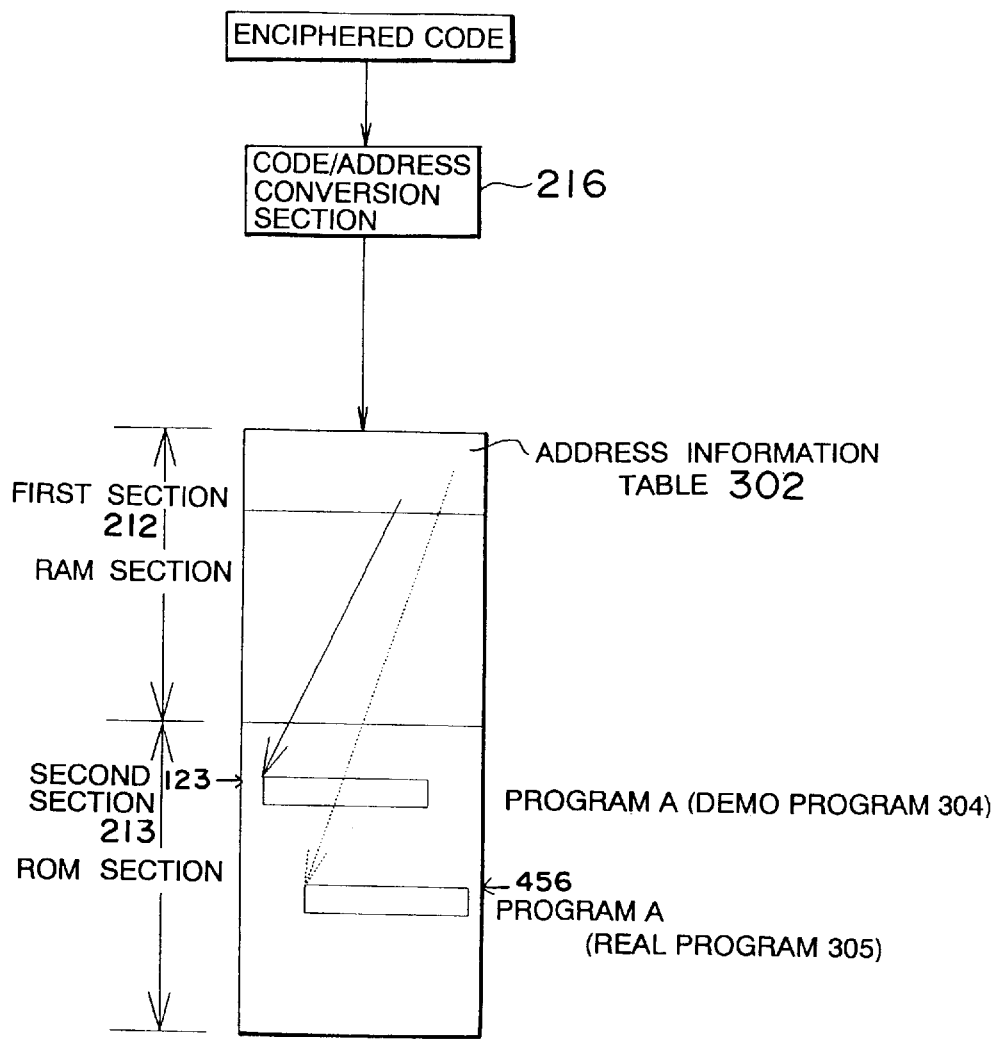
FIGS. 15 and 16 are layout views illustrating the allocation of programs on the disc.

In the title managing information initial data 215, addresses of demonstration programs 304 are registered as addresses for accessing the programs, as illustrated in FIG. 15.

Next, an address information table 302 which is another characterizing feature of the present embodiment will be explained.

The address information table 302 has a construction as illustrated in FIG. 13. Namely, filenames, foremost address numbers corresponding thereto, and record lengths are registered in corresponding relation to each other. Regarding the program A, an address "123" is set with respect to both the demonstration program 304 and a real program 305. Actually, this address "123" is a registered address of the demonstration program 304. Accordingly, even when a user attempts to read out the real program 305 of the program A according to the above-mentioned title managing information table 301, the user actually reads out the demonstration program.

The above-mentioned address information table 302 is effective for handling of programs in the case where, for example, as illustrated in FIG. 15, the demonstration programs 304 and the real programs 305 are registered in the second partition 213 as a ROM region. The real program 305 is a program which is executable in a complete form without being functionally limited while, on the other hand, the demonstration program 304 is a demonstration program in which only part of the function of the corresponding real program is realized.

As explained previously, in the table construction illustrated in FIG. 13, even when a user attempts to call the real program 305 of the program A, he actually calls the demonstration program 304 by way of the registered address "123" of the address information table 302.

However, a user may access the real program 305 corresponding to this demonstration program 304 under prescribed conditions.

That is, a user who wishes to access the real program 305 of the program A pays a charge for this program A. A method of this payment may be a method of entry of money into a bank account or the like with respect to a managing center where the programs are managed, or a method of payment in cash directly made with respect to a sales store or the like.

The managing center or sales store which has confirmed receipt of money with regard to the program A gives an enciphered code to the user by telephone or orally. The user inputs this code via a keyboard 217 connected to the relevant software reproduction apparatus 105, whereby the address information table 302 of the magneto-optical disc is rewritten. Specifically, the enciphered code which has been input via the keyboard 217 is converted to an address rewriting command by a control CPU 4 or 10 functioning as a code/address conversion section 216, with the result that the address information table 302 is rewritten.

FIG. 14 illustrates the address information table 302 after the same has been rewritten. In this figure, the address of the real program of the program A is rewritten from "123" to "456". Accordingly, after the execution of this rewriting operation, when the user has designated the program A, he becomes able to access not the demonstration program 304 but the real program 305.

Although the details will be described later, in a case where a charge imposing information storing section 8 of, for example, a table formation is provided within an SD circuit 3, a charge may be subtracted from the value of the remainder in the charge imposing information storing section 8 when performing payment thereof.

Figure 2:
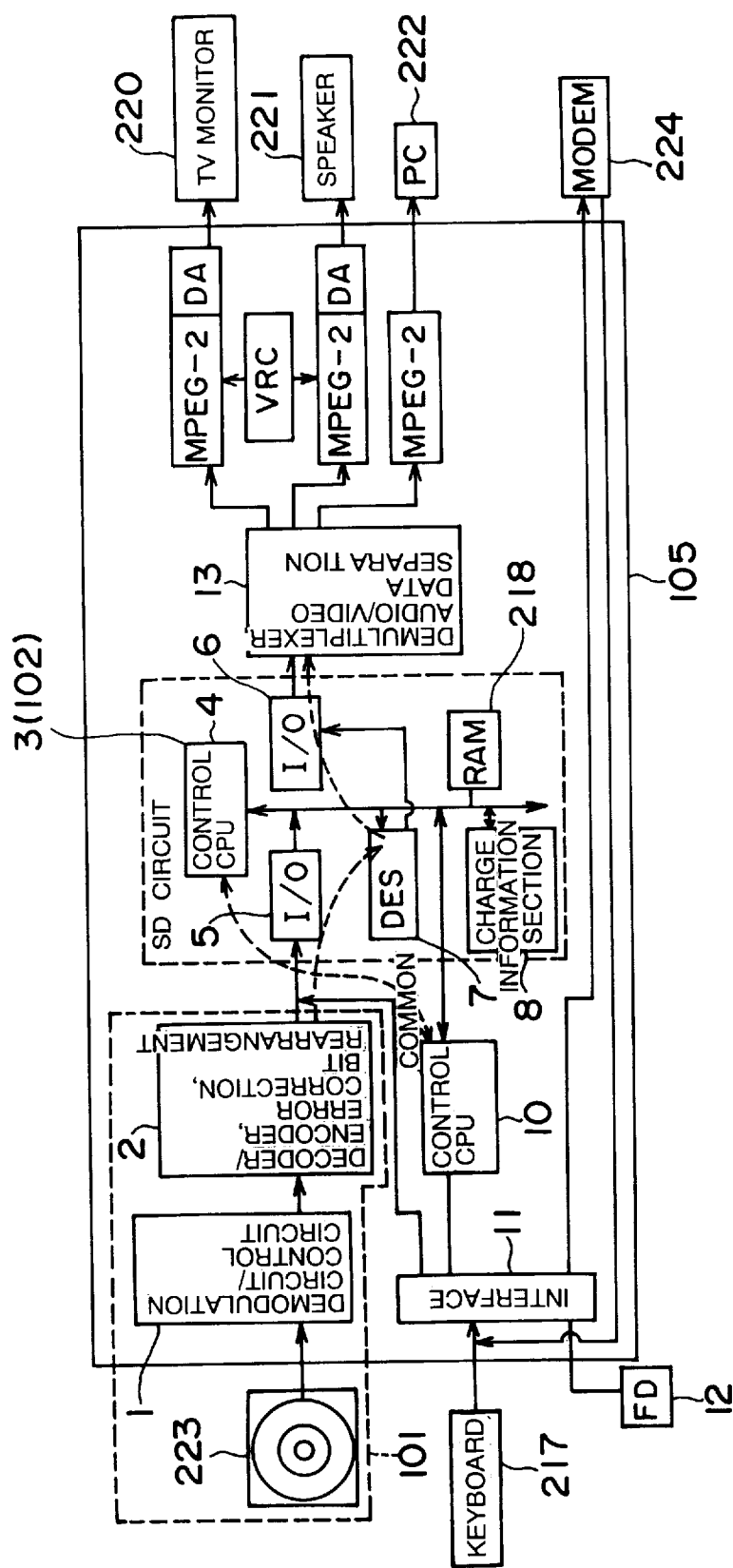
FIG. 2 is a functional block diagram illustrating a software reproduction apparatus in an embodiment of the present invention.

FIG. 2 is a functional block diagram illustrating the construction of a software reproduction apparatus used in the present embodiment.

The part (SD circuit 3) enclosed by a broken line in this figure represents a software managing module 102 of the present invention. This software managing module 102 may be of a type permanently attached within the software reproduction apparatus in the form of a board or card, or may be an IC card removably mounted within a card slot (e.g., a card slot in accordance with PCMCIA) of the software reproduction apparatus.

The software managing module 102 is usually employed for decoding encoded software or for managing money charging. However, in the present embodiment, it is not indispensable, as described later.

In this figure, reference numeral 1 denotes a demodulation circuit/control circuit which has a function of demodulating video/audio data under MPEG standard stored in the megneto-optical disc 101 and supplying them to a decoder/encoder 2. The demodulation circuit 1, decoder/encoder 2 and magneto-optical disc drive 223 are composed as a magneto-optical disc unit (a portion enclosed by a broken line in the figure).

As stated previously, in the present embodiment, these video and audio data are registered as software data in the second partition 213 which is the ROM region of the magneto-optical disc 101. In the present embodiment, a user requests to start up a given application (e.g., application program A) in accordance with the title managing information table 301 which the user has rewritten. In this embodiment, the CD-ROM emulator 212b is first accessed. As stated previously, this CD-ROM emulator 212b has a function of altering an access request for the CD-ROM to an access request for the magneto-optical disc 101. From the control CPU 4 (or control CPU 10), access can be had thereto as in the case of an ordinary CD-ROM.

The decoder/encoder 2 executes error correction and bit rearrangement and thereby outputs programs or video/audio data (code data) in an amount of 2 megabytes/sec at max. (1 megabyte/sec on average), to the SD circuit 3.

In the software managing module 102, i.e. the SD circuit, video and audio data (code data) received by an I/O (input section 5) are decoded by a DES (Data Encryption Standard) 7 serving as a decoding section 103 and then are output to a demultiplexer 13 outside the SD circuit 3 by way of an I/O (6: output section 109). The demultiplexer 13 separates these data into audio data and video data and outputs the same to an MPEG processing section (MPEG-2). The MPEG processing section (MPEG-2) has a function of expanding video/audio data under the MPEG standard of the data compression which has been performed. When audio data and video data are output separately, the synchronization therebetween is co-ordinated by a synchronization control section (VRC) and these data are both respectively output to a TV monitor 220 and a speaker 221. The data may also be output to a personal computer 22 possessed by a user.

Note that, although transmission/reception of these data are shared by the control CPU 10 within the software reproduction apparatus 105 and the control CPU 4 within the SD circuit 3, each of which serves as a permission control section, the control CPU 4 within the SD circuit 3 may be substituted for by the control CPU 10.

The magneto-optical disc unit, the SD circuit 3, the control CPU 10 and the like are connected to an external interface 11 to which there are connected a keyboard 217, a floppy disc drive 12, a MODEM 224 and the like.

Note that the DES 7 of the present embodiment uses [46DATA ENCRYPTION STANDARD NIST] made by FIP'S PUB and the MPEG processing section uses [ISO/IEC CD 13818'1 to 3].

In the SD circuit 3, the control CPU 4 functions as the permission control section and, when software is selected from the above-mentioned menu program 214, refers to the charge imposing information storing section 8. When a charge imposition remainder exists on this charge imposing information storing section 8, the software (data) are read from the CD-ROM 101 and sequentially decoded in the DES 7.

That is, a prescribed amount of money as the remainder is registered in the charge imposing information storing section 8 and an amount of money imposed is subtracted therefrom in correspondence with an amount or time of decoding processing for the encoded softwares. When a user wishes to update the value of this remainder, he can bring to a sales store or the like the software managing module 102 provided as a card medium and pay a specified charge, and can thereby increase the value of the remainder in the charge imposing information storing section 8.

Figure 3:
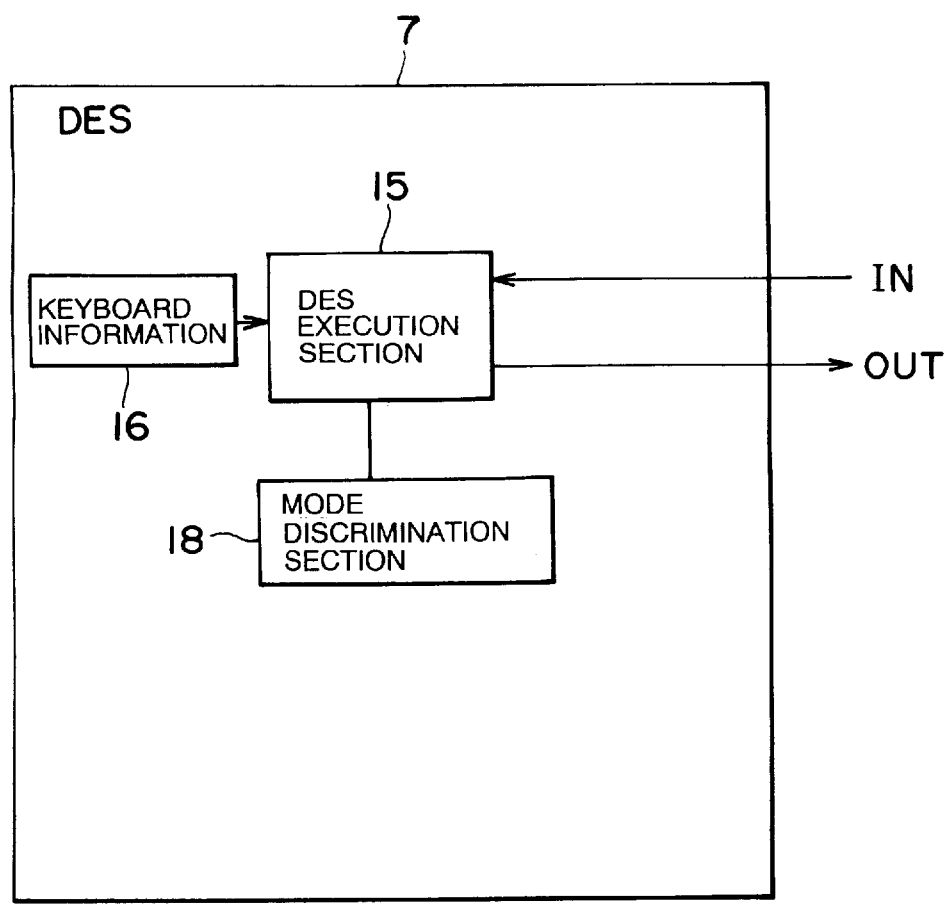
FIG. 3 is a block diagram illustrating an internal function of DES (Data Encryption Standard) in the embodiment of the present invention.

FIG. 3 illustrates a schematic construction of the DES 7. As illustrated in this figure, the DES 7 has a DES execution section 15 (realized by the control CPU 4). It has a function of decoding input data (IN) by means of keyboard information 16 and outputting it as output data (OUT).

In the present embodiment, the DES execution section 15 has a mode discrimination section 18 which has a function of selecting an optimum mode from among a plurality of DES modes according to the relevant data formation or the like and imparting it to the DES execution section 15.

Next, a representative logic of the above mentioned DES modes will be explained.

Figure 4A:
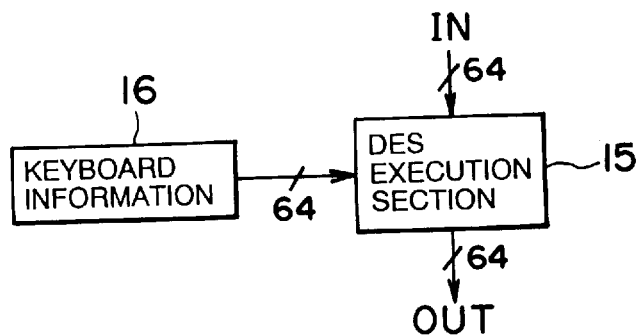
FIGS. 4(a) to 4(d) are present views illustrating modes of DES in the embodiment of the present invention.

FIG. 4A illustrates an ECB basic mode. This mode is that which, in the DES execution section 15, encodes (or decodes) a 64-bit input data array as a 64-bit output data array by means of 64-bit keyboard information 16.

Figure 4B:
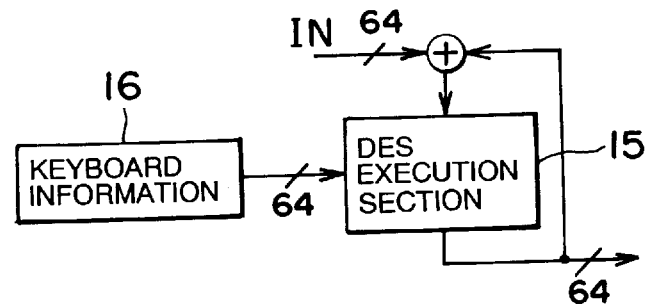

FIG. 4B illustrates a CBC mode. In this mode, after a 64-bit input data array is encoded (or decoded) in the DES execution section 15 by means of 64-bit keyboard information 16, the resulting data are fed back to the DES execution section 15. In this manner, feedback operations are repeated until inputting of all the data is completed, whereupon a final result is output. This mode is suitable for data processing of files or the like.

Figure 4C:
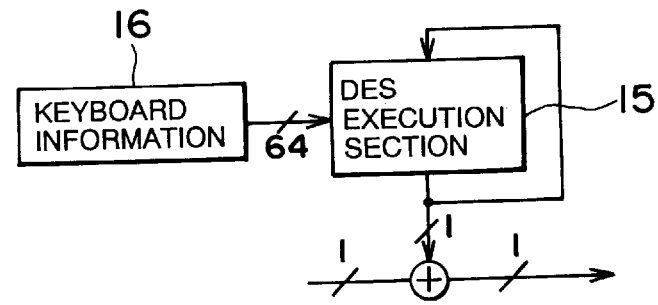

FIG. 4C illustrates an OFB mode. This mode is suitable for processing communication data in which errors are liable to occur, or for processing audio data wherein one error greatly affects the rest of the data.

Figure 4D:
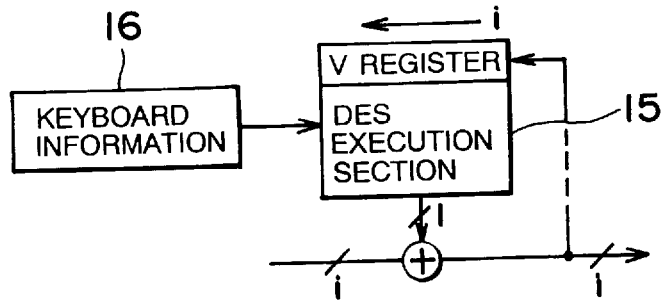

FIG. 4D illustrates a CFB mode. This mode is suitable for processing self-synchronizing type data.

By analyzing the data formation, etc. of relevant data, the mode discrimination section 18 reads out an optimum mode from the above-mentioned modes stored in a mode table 20 and supplies it to the DES execution section 15. The DES execution section 15 performs encoding and decoding processes according to the mode thus selected.

Figure 5:
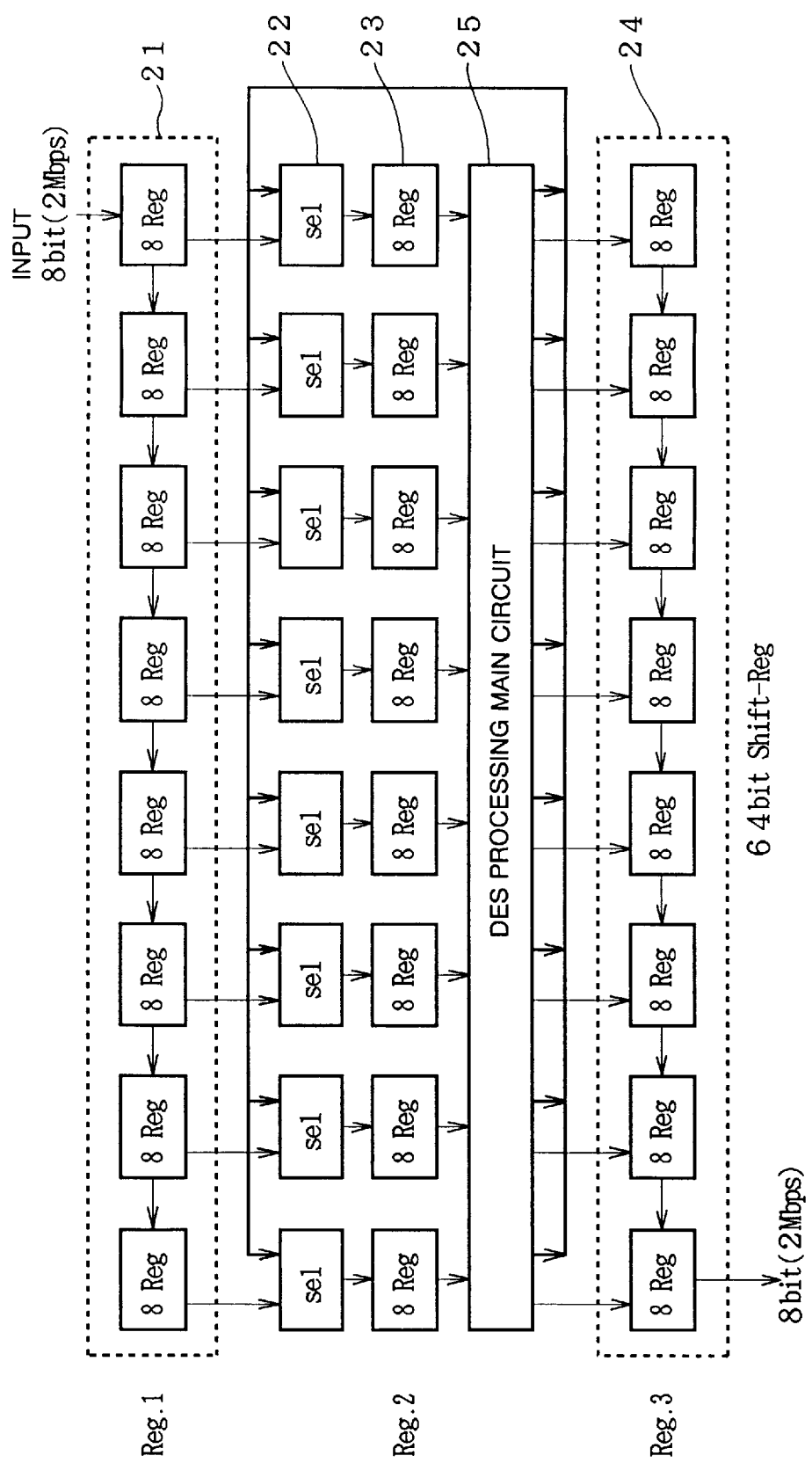
FIG. 5 is a block diagram illustrating a hardware construction of a DES execution section in the embodiment of the present invention.

FIG. 5 is a block diagram illustrating a hardware structure of the DES execution section 15.

In this figure, on the input side, 8 registers each having an 8-bit configuration are connected thereto and a 64-bit shift register (input register 21: REG 1) is disposed as an input buffer. In the next stage, selectors sel 22 are allocated. Each selector can selectively input either an output from a DES processing main circuit 25, as described later, or an output from the above-mentioned shift register 21.

In the next stage after the selectors sel 22 and, registers 23 (REG 2), each having an 8-bit configuration, are disposed the DES processing main circuit 25 is disposed. This DES processing main circuit 25 functions as the DES execution section 15. Namely, in the DES processing main circuit 25, various DES modes, explained in connection with FIG. 4, are registered as ROMs (Read Only Memories), whereby an optimum DES mode logic is selected by an instruction from the control CPU 4 and decoding processing is performed.

The output of the DES processing main circuit 25 is separated into the selectors sel and an output register 24 (REG 3) as an output buffer. The output of the output register 24 (REG 3) is used as encoded or decoded data.

Figure 6:
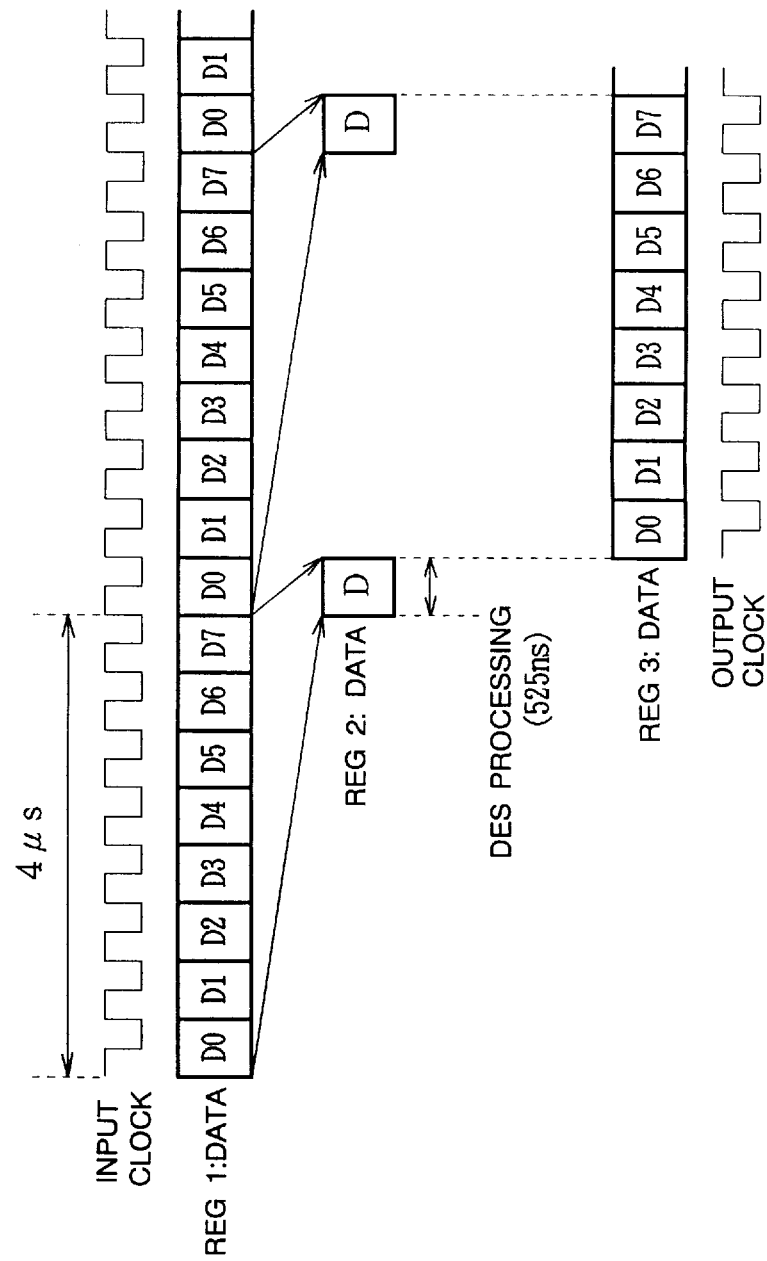
FIG. 6 is a view illustrating a processing sequence in the DES execution section in the embodiment of the present invention.

FIG. 6 illustrates the sequences of this process.

The output of the input register 21 is DES processed as an output from the register 23 by a first clock of the next cycle. The resulting signal is output from the output register 24 by the next clock signal. At this time, from the output register 24 on the input side, reception of encoded data in the next cycle from the input register 21 is performed.

As mentioned above, in the present embodiment, by providing the input register 21 as an input buffer and the output register 24 as an output buffer, entry of encoded data and delivery of decoded data can be independently performed on a continuous basis. As a result, higher decoding and encoding processing is possible compared to that performed by cyclic entry and delivery of data as in the case of conventional DES processing.

Note that in the present invention, the SD circuit 3 is not indispensable however, when data are encoded in the magneto-optical disc 101, the SD circuit 3 is is effective in the case where charging of a rate is performed in correspondence with the extent to which the coded data are reproduced.

In the foregoing description, explanation was given of a case wherein encoded softwares are stored in the second section 213 constituting the ROM region of the magneto-optical disc 101 and a desired encoded software is selected and produced therefrom; according to the title managing information table 301. However, a case where softwares or data are not encoded and these softwares or data are reproduced, for example, in a case where, the demonstration program 304 and the real program 305 are stored in the magneto-optical disc 101 and the demonstration program 304 which is not encoded is reproduced (executed), and a signal read out from the decoder/encoder 2 may be output to the demultiplexer 13 as is without causing the SD circuit 3 to work.

In the previous explanation, in the title managing information initial data 215, addresses of the demonstration programs 304 are registered as addresses for accessing the programs as illustrated in FIG. 15.

However, even when rewriting the title managing information table 301, in a case where payment of a rate for the program is completed and access to the real program 305 is thereby permitted, addresses for the real programs 305 may be previously recorded in a zone separate from the zone of the first section 212 where the address information table 302 is registered, thereby reflecting addresses for the real programs 305 on the address information table 302 even after the title managing information table 301 has been rewritten.

Further, even when, in the address information table 302, addresses for the real programs 305 have been registered, addresses for the demonstration programs 304 may be left therein without erasing addresses for the demonstration programs 304, thereby enabling selective access to one of the two.

Further, addresses for the real programs 305 may be previously encoded as in the case of the softwares so that these encoded addresses can be read out using licensed encoding keyboard information, thereby enabling a user to rewrite these addresses thus read out. In this case, the decoding keyboard information can be obtained from a MODEM 224 via the SD module 102 and telephone/telecommunication lines.

The software recorded in the data recording medium of the present embodiment may be any formation of data such as program data, video data, audio data, text data, dictionary data, etc.

According to the present invention, by providing the title managing information table in a readable and writable region of the magneto-optical disc and registering in this title managing information table only software titles of software which the user needs to use, it is possible, for example, to prevent unnecessary menu ICONs from overflowing in a screen of menus output from the magneto-optical disc, thereby enabling quick and efficient start-up of software titles of softwares which the user needs to use.

What is claimed is:

1. An optical recording medium comprising:
   a data recording medium including
      a first region having data recorded therein and which is readable, and into which data, including title management information, is writable and
      a second region having data recorded therein and which is at least readable, and into which data is non-writable, the recorded data including information regarding initial title management information, so that when the title management information in the first region is altered, the initial title management information is restored from the information in the second region,
      wherein at least two software titles are recorded in said second region, and a title management information table for registering a file name of each software title stored in said second region in association with a loader for executing or reproducing said software title is recorded in said first region.

2. An optical recording medium as claimed in claim 1, wherein said title management information table registers the file names of the software titles in an initial state corresponding to all of the software titles recorded in said second region.

3. An optical recording medium as claimed in claim 1, wherein the data recorded in said first region are in a format different from a CD-ROM logic format and the data recorded in said second region are in the CD-ROM logic format.

4. An optical recording medium as claimed in claim 2, wherein said first region has a CD-ROM emulator for converting an access request to the CD-ROM logic format into an access request to the optical recording medium.

5. An optical recording medium comprising:
   a data recording medium including
      a first region having data recorded therein and which is readable, and into which data is writable,
      a second region having data, including software titles, recorded therein and which is at least; and
      an address information table stored in said second region, to register a file name of each software title stored in said second region and to record an address of each software title recorded in said second region in said first region.

6. An optical recording medium as claimed in claim 5, wherein the software titles recorded in said second region comprise real software titles and demonstration software titles for demonstrating the real software titles.

7. An optical recording medium as claimed in claim 6, wherein said address information table registers addresses for the real software titles and addresses for the demonstration software titles in identical values in an initial state.

8. A software reproduction system, comprising:
   an optical recording medium having a first region having data recorded therein and which is readable and into which data is writable and a second region having data recorded therein and which is at least readable; and
   a software reproduction apparatus for reading software titles recorded in said second region;
   wherein
      an address information recording means is provided in said first region to register addresses used when accessing the optical recording medium, demonstration software titles and real software titles corresponding to the demonstration software titles are registered in said second region, said software reproduction apparatus includes input means for inputting codes, and code-to-address conversion means for converting inputted codes into an address rewrite command for rewriting the addresses recorded in said address information recording means, and an access to the optical recording medium is changed from the demonstration software titles to the real software titles in response to a specified code being input through said input means.

* * * * *